(12) United States Patent
Kim et al.

(10) Patent No.: US 12,531,807 B2
(45) Date of Patent: Jan. 20, 2026

(54) METHOD AND APPARATUS FOR DYNAMIC AND EFFICIENT LOAD BALANCING IN MOBILE COMMUNICATION NETWORK

(71) Applicant: Samsung Electronics Co., Ltd., Suwon-si (KR)

(72) Inventors: Taewoo Kim, Suwon-si (KR); Ashish Billore, Suwon-si (KR); Jonghan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 17/965,346

(22) Filed: Oct. 13, 2022

(65) Prior Publication Data

US 2023/0033272 A1 Feb. 2, 2023

Related U.S. Application Data

(63) Continuation of application No. PCT/KR2021/003632, filed on Mar. 24, 2021.

(30) Foreign Application Priority Data

Apr. 14, 2020 (KR) ........................ 10-2020-0045594

(51) Int. Cl.
*G06F 15/173* (2006.01)
*H04L 47/125* (2022.01)
(Continued)

(52) U.S. Cl.
CPC ........ *H04L 47/125* (2013.01); *H04L 47/2408* (2013.01); *H04L 67/1014* (2013.01)

(58) Field of Classification Search
CPC ....... H04L 47/125; H04L 69/18; H04L 45/02; H04L 69/12; H04L 47/2408; H04L 67/1014; H04L 47/80
See application file for complete search history.

(56) References Cited

U.S. PATENT DOCUMENTS 6,385,449 B2 * 5/2002 Eriksson ........... H04W 28/0808
455/450
7,016,484 B2 * 3/2006 Kumar .................... H04M 3/36
379/221.06
(Continued)

FOREIGN PATENT DOCUMENTS

CN 104980361 A 10/2015
CN 109688219 A * 4/2019 ............. H04L 67/02
(Continued)

OTHER PUBLICATIONS

Extended European Search Report dated Jul. 31, 2023, issued in European Patent Application No. 21787688.7.
(Continued)

*Primary Examiner* — Suraj M Joshi
*Assistant Examiner* — Hao H Nguyen
(74) *Attorney, Agent, or Firm* — Jefferson IP Law, LLP (57) ABSTRACT

A communication technique that integrates a $5^{th}$ generation (5G) communication system for supporting a higher data rate after a $4^{th}$ generation (4G) system with Internet of Things (IoT) technology, and a system thereof is provided. The disclosure can be applied to intelligent services (e.g., smart home, smart building, smart city, smart car or connected car, healthcare, digital education, retail business, security and safety related services, or the like) based on 5G communication technology and IoT-related technology. The disclosure discloses a dynamic and efficient load balancing method and apparatus.

16 Claims, 8 Drawing Sheets

(51) Int. Cl.
  *H04L 47/2408* (2022.01)
  *H04L 67/1014* (2022.01)

(56) References Cited

U.S. PATENT DOCUMENTS

| | | | |
|---|---|---|---|
| 7,068,597 B1 | 6/2006 | Fijolek et al. | |
| 7,158,492 B2* | 1/2007 | Haverinen | H04W 8/04 |
| | | | 370/328 |
| 7,266,079 B2 | 9/2007 | Fan | |
| 8,341,294 B2* | 12/2012 | Ralev | H04L 67/1014 |
| | | | 709/239 |
| 8,711,703 B2* | 4/2014 | Allan | H04L 45/38 |
| | | | 370/255 |
| 8,863,269 B2 | 10/2014 | Nakashima | |
| 9,160,671 B2* | 10/2015 | Janakiraman | H04L 69/22 |
| 9,197,558 B2 | 11/2015 | Allan et al. | |
| 9,660,909 B2 | 5/2017 | Guichard et al. | |
| 9,871,744 B2* | 1/2018 | Janssens | H04L 47/125 |
| 10,033,805 B1* | 7/2018 | Mutnuru | H04L 47/125 |
| 10,148,577 B2 | 12/2018 | Guichard et al. | |
| 10,237,187 B2 | 3/2019 | Paramasivam | |
| 10,411,960 B1* | 9/2019 | Jones | H04L 41/082 |
| 10,491,523 B2 | 11/2019 | Sankar et al. | |
| 10,686,874 B2* | 6/2020 | Yin | H04L 47/70 |
| 10,917,461 B2 | 2/2021 | Doshi et al. | |
| 11,336,715 B2 | 5/2022 | Yin et al. | |
| 11,638,207 B2 | 4/2023 | Baek et al. | |
| 11,843,658 B2* | 12/2023 | Sharma | H04L 67/1025 |
| 2002/0054567 A1* | 5/2002 | Fan | H04L 67/101 |
| | | | 370/235 |
| 2003/0108052 A1* | 6/2003 | Inoue | H04L 61/2517 |
| | | | 370/399 |
| 2006/0209695 A1* | 9/2006 | Archer, Jr. | G06F 9/505 |
| | | | 370/235 |
| 2013/0042317 A1* | 2/2013 | Nakashima | H04L 49/355 |
| | | | 726/13 |
| 2014/0089500 A1* | 3/2014 | Sankar | H04L 47/125 |
| | | | 709/224 |
| 2016/0173373 A1* | 6/2016 | Guichard | H04L 69/22 |
| | | | 370/392 |
| 2016/0191411 A1* | 6/2016 | Kim | H04L 67/04 |
| | | | 726/3 |
| 2017/0317932 A1* | 11/2017 | Paramasivam | G06F 9/5083 |
| 2018/0176153 A1* | 6/2018 | Reumann | H04L 49/25 |
| 2018/0255127 A1* | 9/2018 | Wang | H04L 67/1004 |
| 2019/0200208 A1* | 6/2019 | Chandramouli | H04W 80/10 |
| 2020/0028712 A1* | 1/2020 | Radunovic | H04L 12/4633 |
| 2020/0351204 A1* | 11/2020 | Huang | H04L 45/38 |
| 2020/0412651 A1* | 12/2020 | Patidar | H04L 63/0471 |
| 2024/0427784 A1* | 12/2024 | Rosendahl | G06F 16/24552 |

FOREIGN PATENT DOCUMENTS

| | | |
|---|---|---|
| CN | 110169098 A | 8/2019 |
| EP | 1766881 A2 | 3/2007 |
| KR | 10-2014-0096084 A | 8/2014 |
| KR | 10-2015-0060923 A | 6/2015 |
| KR | 10-2016-0083305 A | 7/2016 |
| KR | 10-1656038 B1 | 9/2016 |
| KR | 10-2016-0083305 B1 | 1/2017 |
| KR | 10-2017-0094796 A | 8/2017 |
| KR | 10-2027749 B1 | 10/2019 |
| WO | 2006/004995 A2 | 1/2006 |
| WO | 2012/093832 A2 | 7/2012 |
| WO | WO-2021205212 A1 * | 10/2021 |

OTHER PUBLICATIONS

Huabing, Zhao, XP002809781, Apr. 16, 2019.
International Search Report dated Jul. 26, 2021, issued in International Patent Application No. PCT/KR2021/003632.
European Office Action dated Dec. 11, 2024, issued in European Patent Application No. 21787688.7.
Chinese Office Action dated Sep. 24, 2024, issued in Chinese Patent Application No. 202180042311.2.
Second Office Action dated Feb. 25, 2025, issued in Chinese Application No. 202180042311.2.
Korean Office Action dated Jun. 13, 2025, issued in Korean Patent Application No. 10-2020-0045594.

* cited by examiner

METHOD AND APPARATUS FOR DYNAMIC AND EFFICIENT LOAD BALANCING IN MOBILE COMMUNICATION NETWORK

CROSS-REFERENCE TO RELATED APPLICATION(S)

This application is a continuation application, claiming priority under § 365(c), of an International application No. PCT/KR2021/003632, filed on Mar. 24, 2021, which is based on and claims the benefit of a Korean patent application number 10-2020-0045594, filed on Apr. 14, 2020, in the Korean Intellectual Property Office, the disclosure of which is incorporated by reference herein in its entirety.

BACKGROUND

1. Field

The disclosure relates to a mobile communication system, and in particular, to a method and an apparatus for load balancing in such a mobile communication system. More particularly, the disclosure relates to a method and an apparatus for dynamic and efficient load balancing in the mobile communication network.

2. Description of Related Art

To meet the demand for increasing wireless data traffic since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (millimeter wave (mmWave)) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the meantime, the Internet is evolving from a human-based connection network where information is created and consumed by people to an Internet of Things (IoT) network where information is exchanged and processed between distributed components such as things. Further, Internet of Everything (IoE) technology is also emerging in which Big Data processing technology is coupled with IoT technology through connection with cloud servers, and the like. Implementation of IoT require various technological elements such as e.g., sensing technology, wired and wireless communication and networking infrastructure, service interface technology, and security technology are required, and thus, studies on technologies such as sensor network, machine to machine (M2M) communication, and machine type communication (MTC) are recently being made. In IoT environment, an intelligent IT (Internet Technology) service may be provided that collects and analyzes data generated from connected things to create new values in human life. The IoT may be applied to a variety of technical fields such as, e.g., smart home, smart building, smart city, smart car or connected car, smart grid, health care, smart home appliance, advanced medical service, or the like, through convergence between the existing information technology (IT) and various industries.

Accordingly, various attempts have been made to apply the 5G communication system to the IoT network. For example, the technologies such as sensor network, machine to machine (M2M) communication, machine type communication (MTC) or the like are being implemented using 5G communication techniques such as beam forming, MIMO, and array antenna. The application of a cloud radio access network (cloud RAN) with the Big Data processing technology described above may be an example of such convergence of 5G technology and IoT technology.

On the other hand, a core network has also been improved to support such a 5G communication system, and the core network supporting the 5G communication system may be referred to as 5G core (5GC). In this circumstance, improvement of load balancing for regulating the load of various network entities constituting such an improved core network is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for efficiently performing load balancing even in a situation in which network resources are not sufficiently secured.

Another aspect of the disclosure it to provide a method for dynamically performing load balancing optimized for data traffic, by proposing a load balancing scheme to efficiently process various requests.

Additional aspects will be set forth in part in the description which follows and, in part, will be apparent from the description, or may be learned by practice of the presented embodiments.

In accordance with an aspect of the disclosure, a method of load balancing is provided. The method includes receiving a service request related to a network entity, selecting an engine to perform load balancing based on a policy related to the service request, creating a load balancing instance including the selected engine, and performing the load balancing for data packets related to the service request through the load balancing instance.

In accordance with another aspect of the disclosure, a load balancer is provided. The load balancer includes at least one engine, an orchestrator for selecting the at least one engine according to a preset policy, and a controller connected to the at least one engine and the orchestrator to control the load balancer, wherein the controller receives a service request related to a network entity, the orchestrator selects an engine to perform load balancing, based on a policy related to the service request, the controller creates a load balancing instance including the selected engine, and the selected engine performs the load balancing for data packets related to the service request through the load balancing instance.

According to the embodiments proposed in the disclosure, it is possible to classify requests and perform load balancing according thereto, thereby providing an optimized service according to the requests. Further, it is possible to render an optimized result according to the requests through the load balancer (or load balancing instance), and thus, network resources for the load balancing can be efficiently saved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing various embodiments in the disclosure, it is to be noted that any description of technical contents that are well known in the technical field to which the disclosure pertains and are not directly associated with the disclosure may be omitted. This is to reveal the subject matter of the disclosure more clearly without obscuring the same, by omitting such unnecessary description.

For the same reason, some components may be exaggerated, omitted, or schematically illustrated in the accompanying drawings. Further, a size of each component in each figure may not fully reflect its actual size. In each figure, the same or corresponding elements are assigned the same or like reference numerals.

Advantages and features of the disclosure, and a method for achieving the same will become apparent by referring to the embodiments described below in detail in conjunction with the accompanying drawings. However, the disclosure is not limited to the embodiments disclosed below, and may be implemented in a variety of different forms. And those embodiments are merely presented to allow the disclosure of the disclosure to be more complete, and to fully inform those having common knowledge in the technical field to which the disclosure belongs of the scope of the disclosure. Thus, the scope of the disclosure will be merely defined by the scope of the claims. Like reference numerals refer to like elements throughout the disclosure.

At this juncture, it will be understood that each block of any flowchart diagrams and combinations of the flowchart diagrams may be performed by computer program instructions. These computer program instructions may be installed in processors of a general-purpose computer, a special-purpose computer, or other programmable data processing equipment, such that the instructions performed by the processors of the computer or other programmable data processing equipment create a means to perform functions described in the flowchart block(s). These computer program instructions may also be stored in a computer-usable or computer-readable memory that may direct the computer or other programmable data processing equipment to implement a function in a certain manner, and therefore, the computer-usable or computer-readable memory, and thus, it is also possible to produce an article of manufacture containing instruction means causing the instructions stored in the computer-usable or computer-readable memory to perform the function described in the flowchart block(s). The computer program instructions may also be installed onto the computer or other programmable data processing equipment, so it is also possible for the instructions to provide operational steps for performing the functions described in the flowchart block(s), by causing the computer or other programmable data processing equipment to execute a series of operational steps to create a computer-executed process.

Further, each block may represent a module, a segment, or a part of code including one or more executable instructions for executing a specified logical function(s). Furthermore, it is to be noted that in some alternative implementations it is also possible for the functions mentioned in the blocks to occur out of order. For example, two consecutive blocks arranged one after another may be performed substantially simultaneously, or the blocks may be sometimes performed in the reverse order according to the corresponding function.

As used in various embodiments of the disclosure, the term unit '~unit (or module)' may include a unit implemented in software or hardware components, such as e.g., field programmable gate array (FPGA) or application-specific integrated circuit (ASIC), to perform a certain role or function. However, the term unit '~unit (or module)' is not limited only to software or hardware. Such a unit or module may be configured to reside on an addressable storage medium or may be configured to regenerate one or more processors. Thus, for example, the term unit '~unit (or module)' may include various components such as software components, object-oriented software components, class components and task components, processes, functions, properties, procedures, subroutines, segments of program code, drivers, firmware, microcode, circuitry, data, database, data structures, tables, arrays, variables and the like. The functions provided in the components and the units (or modules) may be combined into a smaller number of components and units (or modules), or further separated into additional components and units (or modules). Furthermore, the components and the units (or modules) may be implemented to regenerate one or more CPUs in a device or secure multimedia card.

Meanwhile, hereinafter, a terminal (or user equipment (UE)) may include both a mobile terminal, such as, e.g., a mobile phone, a smartphone, or a laptop of a mobile user who is provided with a mobile communication service, and a fixed terminal. A base station (BS) may include, as an entity providing a communication service to a user terminal through a wireless channel, an evolved node B (eNB), a next generation node B (gNB), a transmission point (TP), a transmission and reception point (TRP), a radio access network (RAN) node, and the like.

Hereinafter, in describing the embodiments of the disclosure in detail, description is mainly made of the packet core (alternatively, 5G System, 5G Core Network or NG Core (Next Generation Core)), which is a core network on the mobile communication standard specified by the mobile communication specification standardization organization including 3rd generation partnership project (3GPP) and ESTI (European Telecommunication Standards Institute), but the main gist of the disclosure may be also applied with slight variations to other communication systems having the same or similar technical background, within the scope without significantly departing from the scope of the disclosure. Such application would be possible at the determination of an expert skilled in the technical field of the disclosure.

For convenience of description, hereinafter, some terms and names defined in the 3GPP standard specification and the ETSI standard specification may be used. However, the disclosure is not limited by the terms and names, and may be equally applied to communication systems conforming to other technical standards.

Further, as used in the disclosure set forth below, the terms referring to objects of the core network, the terms referring to messages therein, the terms referring to interfaces between network entities, and the terms referring to various identification information are all exemplified for convenience of description. Therefore, the terms are not limited to the those used in the disclosure, and other terms referring to the objects having equivalent or like technical meanings may be used. For example, the term 'network entity' may have the same technical meaning as various terms such as a network element, a network function, a network instance, a network node or the like.

Figure 1:
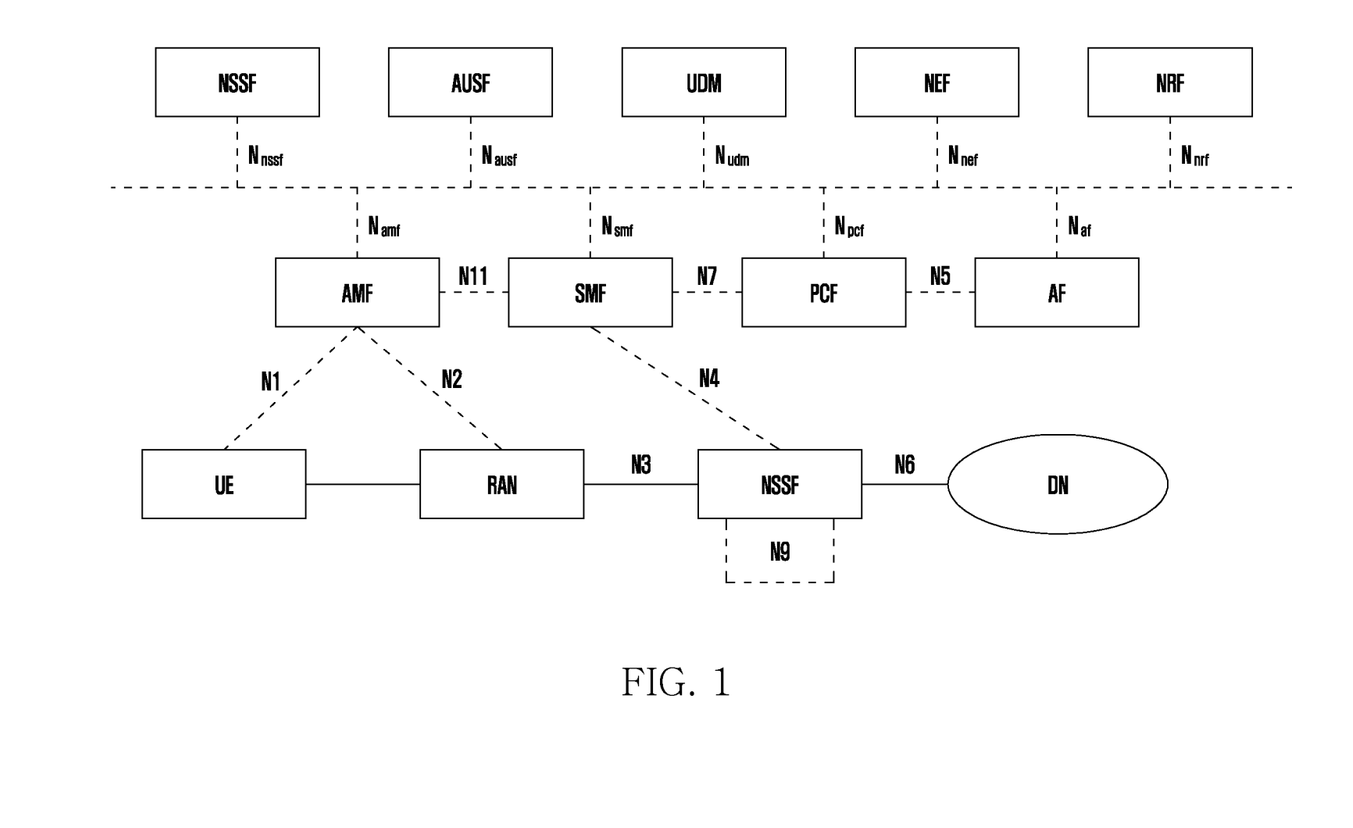
FIG. 1 is a diagram illustrating a core network structure and their network entities according to an embodiment of the disclosure.

FIG. 1 is a diagram illustrating a core network structure and network entities according to an embodiment of the disclosure.

A unit that performs each function provided by a 5G mobile communication system may be defined as a network entity, a network element (NE), or a network function (NF). The core network structure of the 5G mobile communication system and the network entities constituting the same are shown in FIG. 1.

Referring to FIG. 1, a representative network entity may include, for instance, Access and Mobility Management Function (AMF) managing network access and mobility of a terminal, Session Management Function (SMF) performing session-related functions, User Plane Function (UPF) responsible for transfer of user plane data, Application Function (AF) assisting in controlling user plane routing state in consideration of service requirements, Network Exposure Function (NEF) performing a function to expose the functions of core network entities to the outside, Unified Data Management (UDM) and Unified Data Repository (UDR) responsible for data storage and management, Policy and Control Function (PCF) responsible for managing billing and policy, Network Slice Selection Function (NSSF) selecting a specific network slice using Network Slice Selection Assistance Information (NSSAI) for a request for Packet Data Network (PDN) session from a terminal, Authentication Server Function (AUSF) providing unified authentication of subscribers for various types of services, Network Repository Function (NRF) monitoring service status of core network NFs and supporting interworking between the NFs, and Data Network (DN) that is a service network for providing the terminal with a service of either an operator or a third party.

The network entities shown in FIG. 1 may be connected with each other via an interface defined between each other. For example, an interface between AMF and SMF may be defined as N11, an interface between SMF and UPF as N4, an interface between UPF and DN as N6, an interface between AMF and RAN as N2, and an interface between RAN and UPF as N3.

Further, a service-based interface (SBI) is defined for specific network entities, for example, an interface of NSSF may be defined as Nnssf, an interface of AMF as Namf, an interface of SMF as Nsmf, an interface of PCF as Npcf and so on.

The core network structure described in FIG. 1 is merely an example, and the core network may include a larger number of other network entities for providing mobile communication services. In addition, the names of the network entities and interfaces described above are merely examples, and those names and functions of the network entities and the names of the interfaces may be referred to differently as much as one prefers. In other words, the contents of the disclosure to be described below should not be construed as being limited to the definitions and descriptions of the network entities and interfaces shown in FIG. 1.

Various researches and developments on Software Defined Network (SDN) and Network Function Virtualization (NFV) have been recently made. Accordingly, description will be made of SDN and NFV.

First of all, the term 'SDN' is a concept of separating a portion responsible for a control function and a portion responsible for a transmission/reception function of a network entity. That is, it may mean that the network entity is responsible for only the transmission/reception function and the control function is transferred to a separate general-purpose server. By way of this separation, a separate server in charge of the control function can make efficient control of multiple network devices.

The term 'NFV' may mean virtualizing a network entity. Specifically, NFV may refer to logically dividing the resource of a physical network entity so that it can be shared and used together with multiple users or devices. Accordingly, the resource usage efficiency may be increased by allowing the resource of network entity to be shared by multiple virtual machines (VMs) through the NFV, the network construction costs can be reduced by separation of software/hardware, and more flexible installation is possible compared to the physical network entities.

By virtualizing the physical network resource as described above, it is also possible to keep the virtual network configuration the same even if the physical network configuration is changed, so as not to affect the VM virtualized network function (VNF). In this context, the physical network may be referred to as an underlay and the virtual network may be referred to as an overlay.

In addition to the above-mentioned contents, research and development on clouding a telco (telecommunication company) network has been recently conducted. The cloud has the advantage of being able to use a much more flexible container than the virtual machine or NFV described above. Accordingly, research and development on flexible operation and expansion of network entities is recently being made, by containerizing the telco-oriented VNF to build a telco cloud network.

Such a telco cloud network may refer to cloud-based implementation of technologies, products, solutions and the like provided by conventional business platforms. In the telco cloud network, major indicators for determination of its performance reliability may include, for example, availability, quality of service (QoS), service continuity, and the like.

Figure 2:
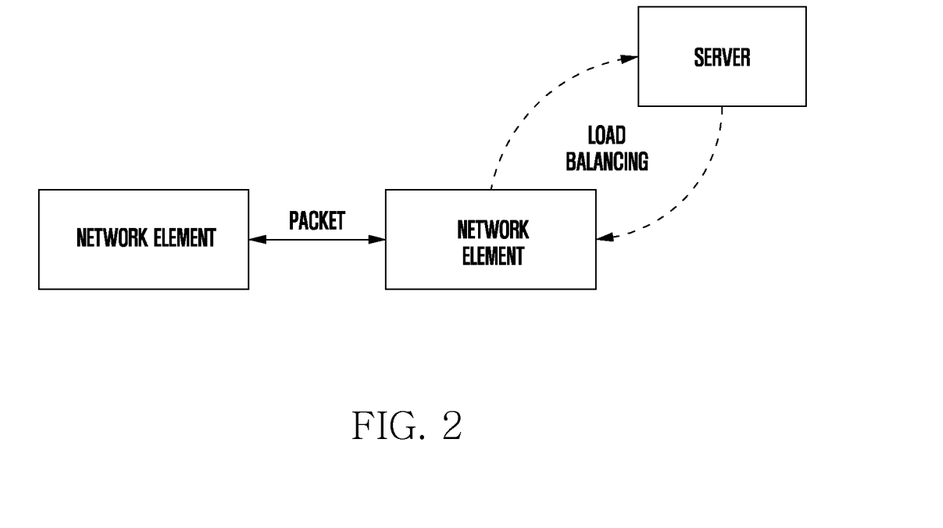
FIG. 2 is a schematic diagram illustrating a load balancing process of network elements according to an embodiment of the disclosure.

FIG. 2 is a schematic diagram illustrating an example load balancing process of a network element according to an embodiment of the disclosure.

A network element used in the following description may have the same meaning as a network entity, a network function, a network instance, and a network node, as defined above.

Referring to FIG. 2, the network elements constituting the core network may communicate with other network elements via a predetermined interface to transmit and receive packets. In this process, it is generally required for the load state to be considered in order to process a packet or request received by the network element efficiently, and this way of sharing or distributing the load for processing the packet or request according to a predetermined criterion in consideration of the load state between the network elements (or network entities) may be referred to as load balancing.

On the other hand, the conventional load balancing is performed by a separate server arranged out of the network element, and this load balancing method does not fully meet the requirements for the containerized core network described above. For example, the conventional load balancing may be a solution suitable for a usage case of a cloud network or web scale to which L4 protocol or L7 protocol is applied. Therefore, according to the conventional load balancing method, in case where both the protocols have to be processed, the load balancers must be implemented in a cascading connection in which the load balancers are sequentially connected for each protocol.

However, this type of conventional load balancing method makes it impossible to meet the requirements of the telco cloud network for the following reasons.

First, it is required to support processing of various protocols (e.g., stream control transmission protocol (SCTP), hypertext transfer protocol version 2 (HTTP2.0), and the like) using a single load balancer. In particular, in an edge scenario or a far-edge scenario where network resources are not sufficient to implement a multi-level of load balancer to support multiple protocols or layers, a new scheme of load balancing different from the conventional load balancing method is required.

Secondly, it is required the ability capable of dynamically adjusting the load balancing topology. In other words, in order to dynamically control or change various topologies such as, e.g., in-middle, edge, and pass-through load balancing on the network, a new scheme of load balancing method different from the conventional one is required.

Thirdly, it is required the load balancing optimized for classification or telco-relevant attributes. That is to say, in order to dynamically reflect such classifications and attributes, a novel load balancing scheme for utilizing kernel-based routing or hardware offloading is required, as opposed to the prior arts.

Finally, when configuring a load balancing chain to process a packet received according to a request, it is required to configure a differential and prioritized load balancing path. That is, a novel load balancing scheme is required to efficiently configure the load balancing chain according to the priority based on the nature of the received packet, such as the source, the destination, and whether it is voice or data.

Figure 3:
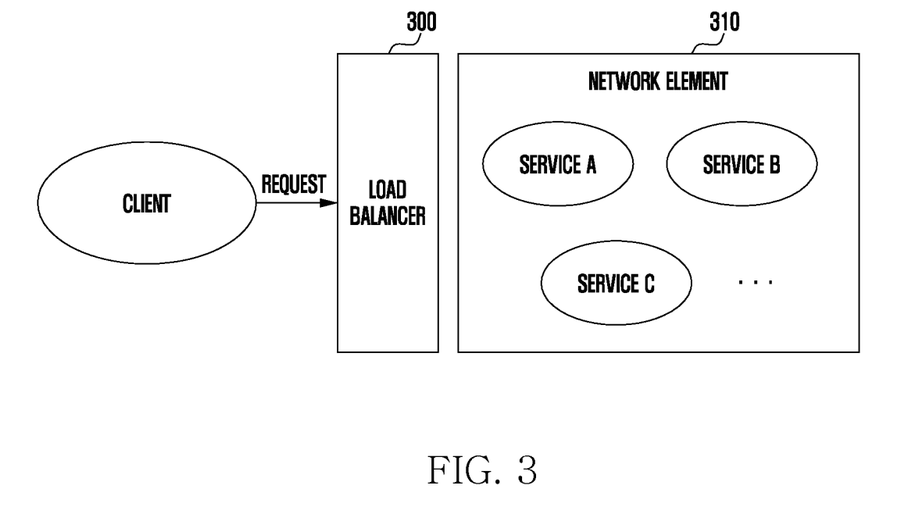
FIG. 3 is a schematic diagram illustrating a load balancing process according to an embodiment of the disclosure.

FIG. 3 is a schematic diagram illustrating an example load balancing process according to an embodiment of the disclosure.

In the following embodiment, it is proposed a load balancing method for intelligently and dynamically processing requests delivered to network entities of a core network and a load balancer for the same.

The load balancing method and load balancer according to an embodiment of the disclosure can provide a solution capable of supporting data packet classification and enhanced platform awareness (EPA) for packet flow received according to a client's request, as well as providing improved performance with low-latency, low-footprint, resource-optimization, or the like.

The relationship of the load balancing method and load balancer with a network element may be defined according to that shown in FIG. 3.

Referring to FIG. 3, a load balancer 300 according to the proposed embodiment may be implemented to correspond to a specific network element 310, and perform the load balancing to detect a request transmitted from a client to the network element 310 and process the same.

More specifically, the load balancer 300 according to an embodiment may receive a request for various services (e.g., service A, service B, service C, etc.) provided by the network element 310 from the client, and perform load balancing on the request so that the network element 310 can efficiently utilize network resources for processing the request.

In particular, as described above, since requests according to protocols and packet characteristics of different layers can be received from various clients, the load balancer 300 has to intelligently perform the load balancing to allow the network element 310 to efficiently process these requests. To this end, the load balancer 300 will have to classify the requests of the client so that the network element 310 can provide an optimized service.

Further, the load balancer 300 may be implemented to correspond to the network element 310. That is, according to the conventional load balancing method described with reference to FIG. 2, there exists a separate server for processing load balancing of a specific network element, but the load balancer 300 according to an embodiment as proposed may be implemented to correspond to (or be dependent on) the network element 310.

Thus, it may be understood by this relationship that the network element 310 may have its own load balancer 300 inside or outside, and the network element 310 may include one or more load balancers 300 corresponding to its own. For example, when the number of requests received from the client is relatively high, the network element 310 may include a plurality of load balancers 300 for processing them.

Figure 4:
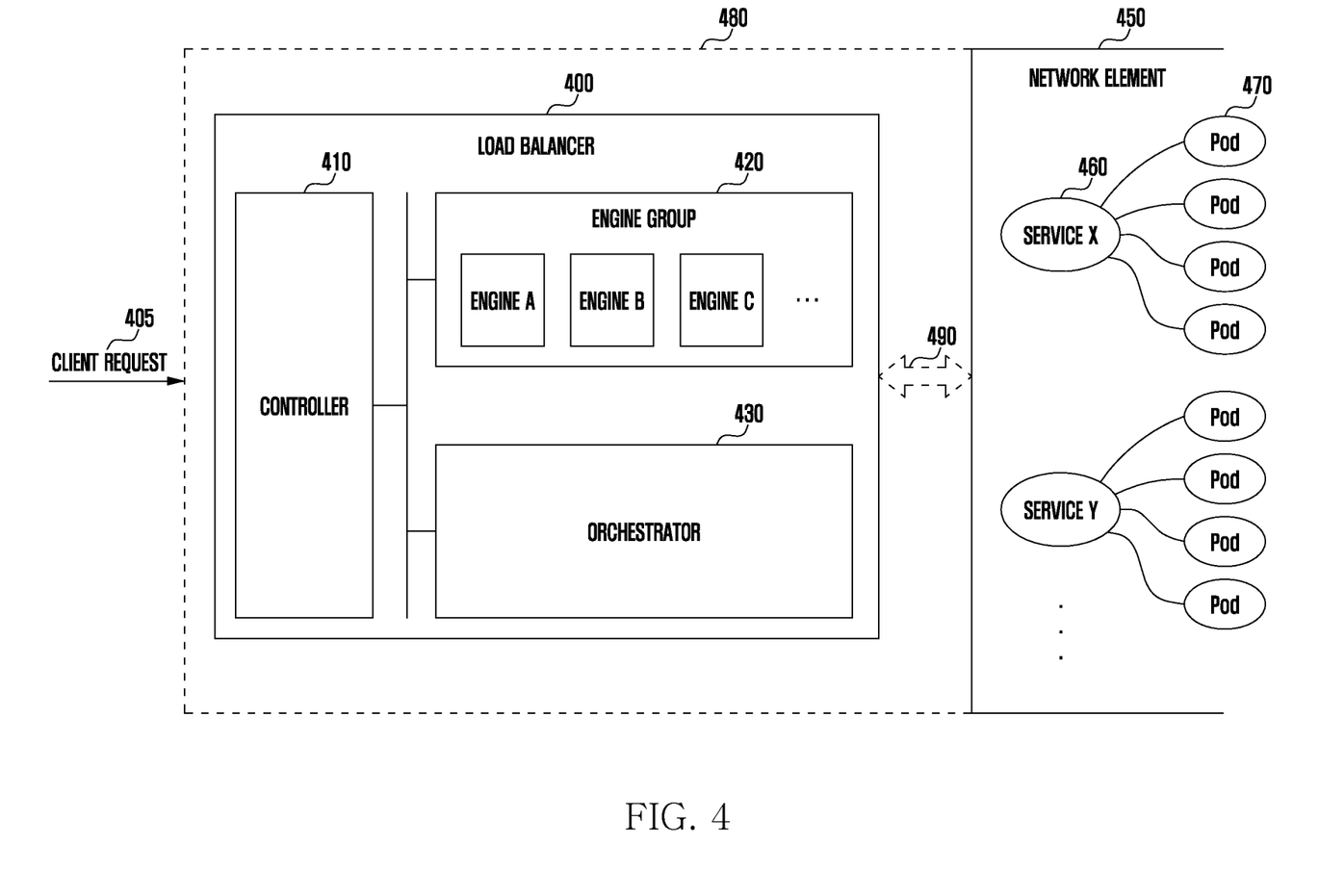
FIG. 4 is a diagram illustrating a load balancing process and a structure of a load balancer according to an embodiment of the disclosure.

FIG. 4 is a diagram illustrating an example load balancing process and a structure of a load balancer according to an embodiment of the disclosure.

Referring to FIG. 4, according to an embodiment, a load balancer 400 for (or corresponding to) a network element 450 may include various components. For example, the load balancer 400 according to an embodiment may include a controller 410, an engine group 420 and an orchestrator 430, and an expert skilled in the art would easily appreciate that the illustrated structure and configuration are merely examples.

Each component of the load balancer 400 shown in FIG. 4 may be of a logical configuration implemented in software, or may be implemented, for example, with a service, a container, or other conceptual configuration. Alternatively, some or all of the components may be implemented as hardware. Hereinafter, each component shown in FIG. 4 is described in detail.

First, the engine group 420 may include one or more engines (engine A, engine B, engine C, etc. in FIG. 4), and the one or more engines (or modules) included in the engine group 420 may perform actual load balancing for packet flow. To this end, the engine group 420 may perform a selection of a list of backends, current status, connection tracking, and a specific backend, for the one or more engines (or modules).

In particular, each engine included in the engine group 420 may perform load balancing for a specific protocol. For example, the engine group 420 may include an ipvsadm engine (or module) that performs load balancing of packet flow for the SCTP protocol, and may include an envoy engine (or module) or an nginx engine (or module) that performs load balancing of packet flow for the HTTP2.0 protocol. Further, the engine group 420 may include a smart network interface card (NIC) or a field programmable gate array (FPGA) as a hardware accelerator for off-loading and processing large-capacity of packets. Further, these engines or modules may perform load balancing related to protocols of various layers, such as L4 or L7.

Load balancing for packet flow of a specific protocol may be processed by one engine (module) included in the engine group 420, as well as a plurality of different engines (modules) supporting the protocol. On the contrary, it goes without saying that packet flows for a plurality of different protocols may be processed by one engine (module).

On the other hand, the one or more engines or modules included in the engine group 420 may be implemented using virtual resources such as a service or a container, and the one or more engines or modules may be implemented in hardware included in the engine group, as opposed to the above. The engine or module being implemented in hardware may imply that the load balancer 400 and the corresponding engine or module are physically connected.

Next, the orchestrator 430 is configured to store and manage a policy and a configuration related to load balancing. In other words, the orchestrator 430 may have and hold information about the load balancing scheme and engine (or module) that the load balancer 400 can use, and interact with a network element 450, thereby dynamically determining which load balancing scheme to select for a client request 405 for a service 460 provided by the network element 450.

This determination process may be performed according to the policy and criteria input to the orchestrator 430. For example, the orchestrator 430 may determine the load balancing scheme that can satisfy service level agreement (SLA) and quality of service (QoS) of the packet flow, according to the characteristics of the packet flow or the type of protocol corresponding to the request. The process in which the orchestrator 430 determines the load balancing scheme may be generally described as a process of determining whether to perform load balancing at an application level (i.e., L7), whether to perform load balancing at a kernel level (i.e., L4), or whether to perform load balancing at a hardware level. Further, the orchestrator 430 may select a specific engine for performing load balancing in addition to determining such a load balancing scheme.

Finally, the controller 410 may control the overall operation of the load balancer 400. For example, the controller 410 may initiate instantiation of the load balancer 400 once the client request 405 is detected, and generate a load balancing instance including the load balancing scheme and engine (or module) selected by the orchestrator 430. Further, in case where a change is required in the load balancing instance according to circumstances, the controller 410 may change or update the configuration of the load balancer 400.

When the load balancer 400 or the load balancing instance is configured according to the request of the controller 410, the load balancer 400 or the load balancing instance may assign a pod 470 for the network element 450 to provide a service (e.g., service X, service Y or the like) corresponding to the packet flow. For example, the pod 470 for providing a service may be assigned in multiple, and the load balancer 400 or the load balancing instance may assign the pods 470 so that the network element 450 can process the packet flow.

On the other hand, as described above, the load balancer 400 or the load balancing instance may be implemented to correspond to the network element 450, and the topology of the load balancer 400 or the load balancing instance may be implemented in various schemes. For example, as shown in FIG. 4, the load balancer 400 or the load balancing instance may be implemented as protocol termination topology located outside the network element 450, and as shown by a dotted line 480, may be implemented in pass-through based in-middle proxy topology located inside the network element 450. Furthermore, in a Kubernetes environment, it may be implemented in sidecar topology.

In the examples of the various topologies described above, the load balancer 400 or the load balancing instance may be connected (e.g., connection 490) to the network element 450 to send and receive signaling, through which smooth load balancing for the packet flow can be achieved.

Figure 5:
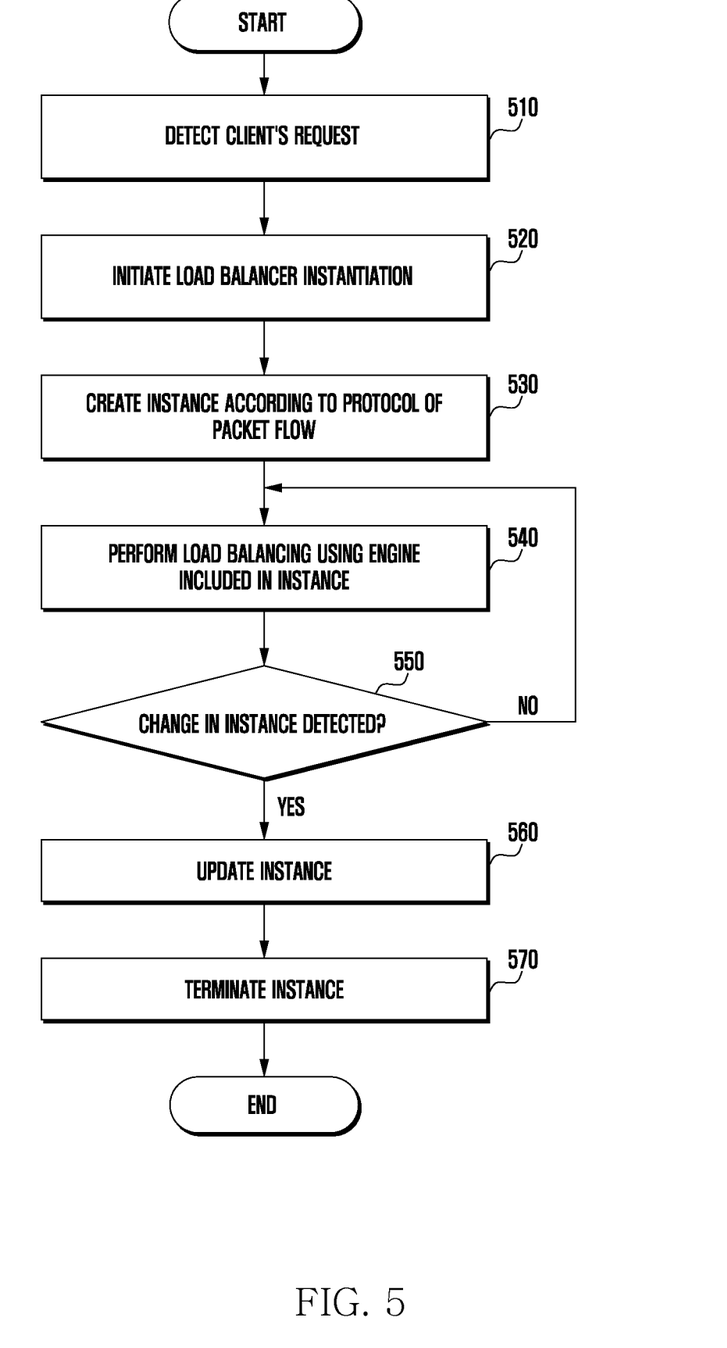
FIG. 5 is a flowchart illustrating a load balancing process according to an embodiment of the disclosure.

FIG. 5 is a flowchart illustrating an example load balancing process according to an embodiment of the disclosure. The flowchart shown in FIG. 5 illustrates operations of the load balancer or the load balancing instance according to the above-described embodiment over a time sequential flow.

Referring to FIG. 5, a flowchart of a proposed load balancing process is illustrated, and the flow of the operations illustrated therein may be performed in a different order without being limited thereto. In other words, unlike the embodiment described in FIG. 5, it may be also implemented so that some of the operations in between the components of the load balancer or load balancing instance are performed simultaneously, or so that a specific operation amongst them is performed earlier (or later) than other operations.

First, the load balancer (or load balancing instance) may detect a client request in operation 510. This process may be understood as receiving a request for a service from the outside.

The load balancer (or the load balancing instance) may initiate its instantiation in operation 520, when a request is detected. Specifically, the controller of the load balancer (or load balancing instance) described above may determine that it is necessary to perform load balancing according to the request, and initiate (or starts) an operation for configuring the load balancing instance.

Then, the load balancer (or load balancing instance) may create a load balancing instance according to the protocol of the packet flow detected according to the request in operation 530. This process may be described as a process of transmitting, by the controller of the load balancer (or load balancing instance), the request to the orchestrator, and identifying the load balancing scheme and the engine (or module) selected by the orchestrator to determine the engine group to perform load balancing.

The load balancer (or load balancing instance) may perform load balancing using the engines of the configured engine group in operation 540. That is to say, the load balancer (or load balancing instance) may perform a process of selecting and allocating pods for providing a service so that the network entity can process the packet flow actually received following the request.

The load balancer (or load balancing instance) may perform allocating network resources, by selecting and configuring the pods so that the network entity can provide a service to be processed dynamically and efficiently for continuously received packet flows.

On the other hand, the load balancer (or load balancing instance) may detect that a change in the load balancing instance is required during the load balancing process in operation 550. For example, when a specific pod is restarted or the Internet protocol (IP) information is changed by means of scaling-in or scaling-out of the network resources, the load balancer (or load balancing instance) may determine that a change in the load balancing instance is required.

In such a case, the controller of the load balancer (or load balancing instance) may change the load balancing scheme of the load balancer (or load balancing instance) or newly configure the engine (or module), thereby building a load balancing instance optimized for the change. That is, the load balancer (or load balancing instance) may update the load balancing instance in operation 560.

Then, the load balancer (or load balancing instance) may terminate the load balancing instance in operation 570, when it is determined that no more load balancing is required. For example, when a predetermined condition is satisfied, such as when there is received an explicit termination input or when no packet flow is received for a certain period of time, the load balancer (or load balancing instance) may terminate the load balancing instance.

Figure 6:
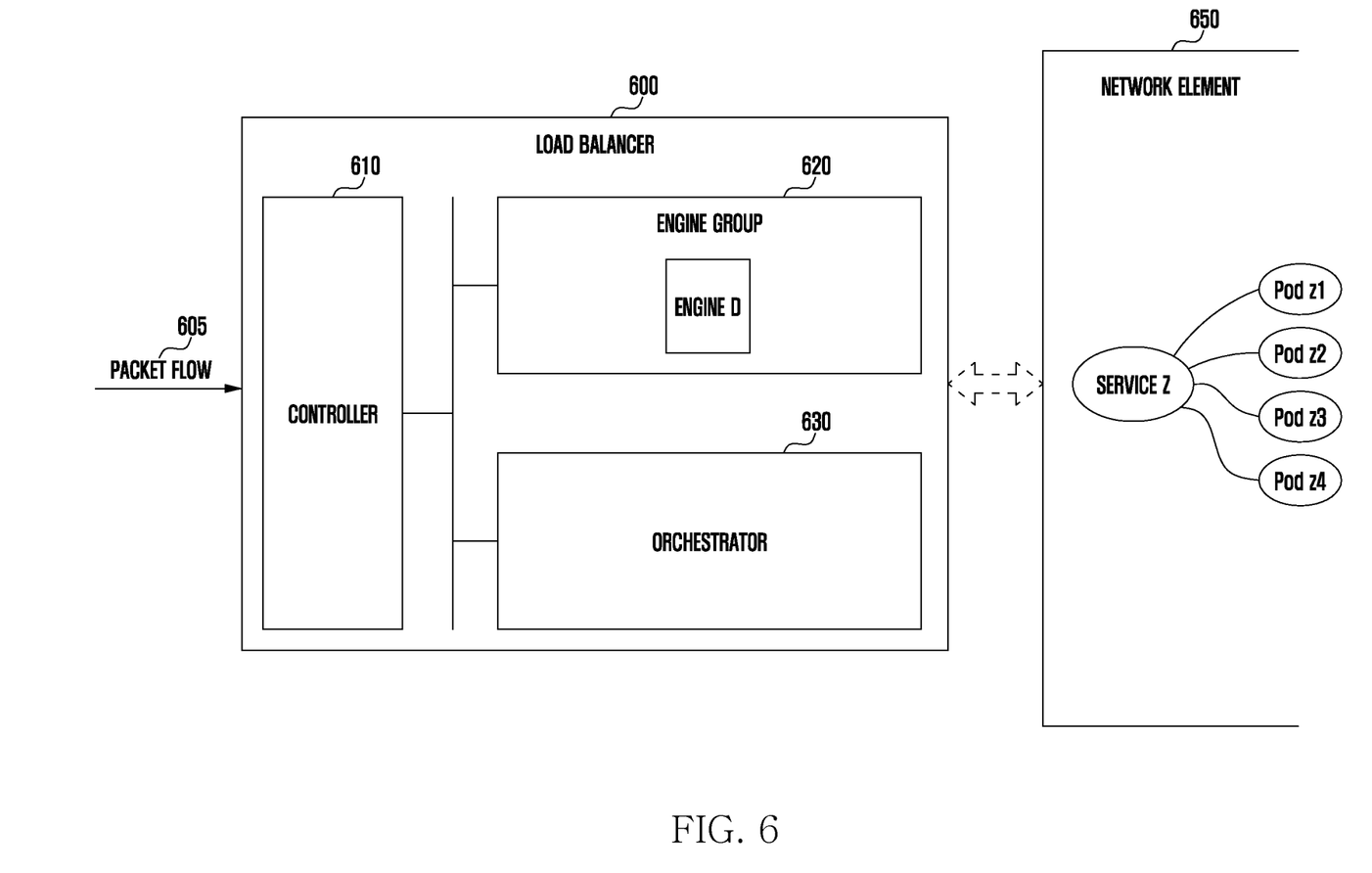
FIG. 6 is a diagram illustrating a load balancing process and a structure of a load balancer according to an embodiment of the disclosure.

FIG. 6 is a diagram illustrating a load balancing process and a structure of a load balancer according to an embodiment of the disclosure. FIG. 6 describes a process in which a load balancing instance is configured to perform load balancing on a packet flow according to the embodiments described with reference to FIGS. 4 and 5 above.

Referring to FIG. 6, when the controller 610 receives the client's request and identifies the load balancing scheme and engine (or module) selected from the engine group 620 by the orchestrator 630, the controller 610 may create a load balancing instance 600 including such an engine (e.g., engine D).

The load balancing instance 600 may perform load balancing so that the received network element 650 can efficiently process the packet flow 605, and allocate a plurality of pods so that the network element 650 can efficiently provide the packet flow 605. Through this, the network element 650 may configure a plurality of pods (e.g., Pod z1, Pod z2, Pod z3, Pod z4) to provide a service Z, and thereby process the packet flow 605.

Figure 7:
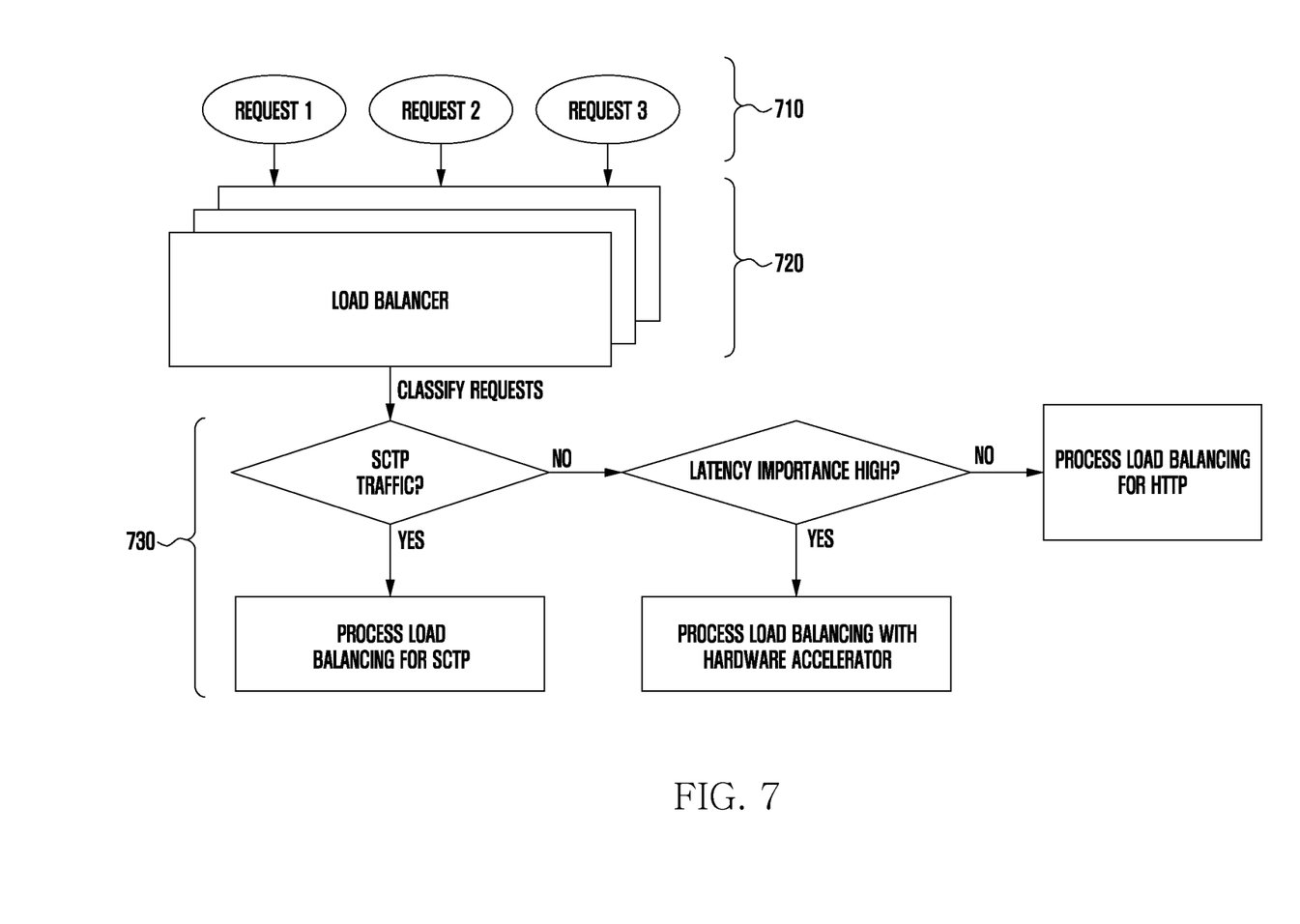
FIG. 7 is a flowchart illustrating a load balancing process according to an embodiment of the disclosure.

FIG. 7 is a flowchart illustrating a load balancing process according to an embodiment of the disclosure.

Referring to FIG. 7, it is described an example in which the load balancer (or load balancing instance) configures a load balancing instance concretely as various requests are received.

As described above, the orchestrator of the load balancer (or load balancing instance) can determine the load balancing scheme and manage criteria, policies and settings for selecting an engine. Such criteria, policies, and settings may be provided to the orchestrator from the user or from an external system, and the orchestrator may select which load balancing scheme to handle received requests according to the criteria, policies, and settings.

Hereinafter, examples of such criteria, policies, and settings will be described in greater detail. The criteria, policies, and settings managed by the orchestrator and used to create a load balancing instance may include at least one or more of the following elements.

Source/Destination Pair: This element is a parameter as to which service request is received from which client, for configuring the optimum load balancing instance and its topology to process a request. If a specific protocol not supported by a backend service is required, or an immediate response is required as a request arrives from an unreliable connection, the load balancing instance created based on this parameter may become a termination-based load balancing instance.

Whether Application Protocol Is Supported: This element is a parameter corresponding to the case where the received request is, for example, HTTP2, gRPC (google remote procedure call), or SQL (structured query language). When a request matching this parameter is received, the controller and orchestrator may provide application protocol support capable of service-awareness, and may derive telemetry such as e.g., the number of requests per second, the number of messages per queue, or the like, in order to properly manage the load on the backends capable of such support. According to an embodiment, an engine such as e.g., envoy or nginix L7 proxy may be selected as an engine for supporting such an application protocol, and a sidecar pattern may become an efficient topology for the topology of the load balancing instance.

Latency Critical Request: This element is a parameter indicating that the type of data traffic associated with the request being received is of high importance and sensitivity to delay, such as voice processing. The controller and the orchestrator may be configured with a load balancing instance including an engine or module (e.g., dpdk, P4 programmable module) capable of supporting hardware acceleration in order to minimize processing delay.

Whether Kernel Stack Is Supported: This element is a parameter corresponding to a circumstance to provide connectivity by stably processing some protocols such as SCTP supported in Linux kernel. When a request matching this parameter is received, the controller and the orchestrator may select the ipvsadm engine (or module) as an example, and the load balancing instance according to an embodiment may be configured in a pass-through-based topology and reduce the overhead by performing connection tracking and network address translation (NAT).

The above-described elements and parameters are merely various examples of criteria, policies, and settings for configuring a load balancing instance, and other elements and parameters may be considered in various ways without limiting thereto. For example, the controller and the orchestrator may configure the load balancing instance and its topology, taking into account one or more of the elements and/or parameters such as e.g., the performance required, the protocol type related to request, the requirements, the type of data packet (voice, data, and the like), or the tier or importance of the data packet.

For example, referring to FIG. 7, the load balancer 720 may receive various requests 710, classify the requests 730, configure a load balancing instance, and perform a load balancing processing.

For example, when the data packet according to the request is SCTP-related traffic, it will be configured a load balancing instance including an engine for processing SCTP-related traffic and capable of L4 processing. As another example, when the data packet according to the request is not related to the SCTP protocol and the delay importance is also low, it will be configured a load balancing instance including an engine for processing HTTP-related traffic and capable of L7 processing. As another example, when the data packet according to the request is not related to SCTP protocol but has high latency importance, then a load balancing instance including an engine capable of operating as a hardware accelerator will be configured.

As described above, in order to perform load balancing optimized for various types of requests, the load balancer (or load balancing instance) may classify the requests and configure an efficient load balancing instance corresponding thereto.

Figure 8:
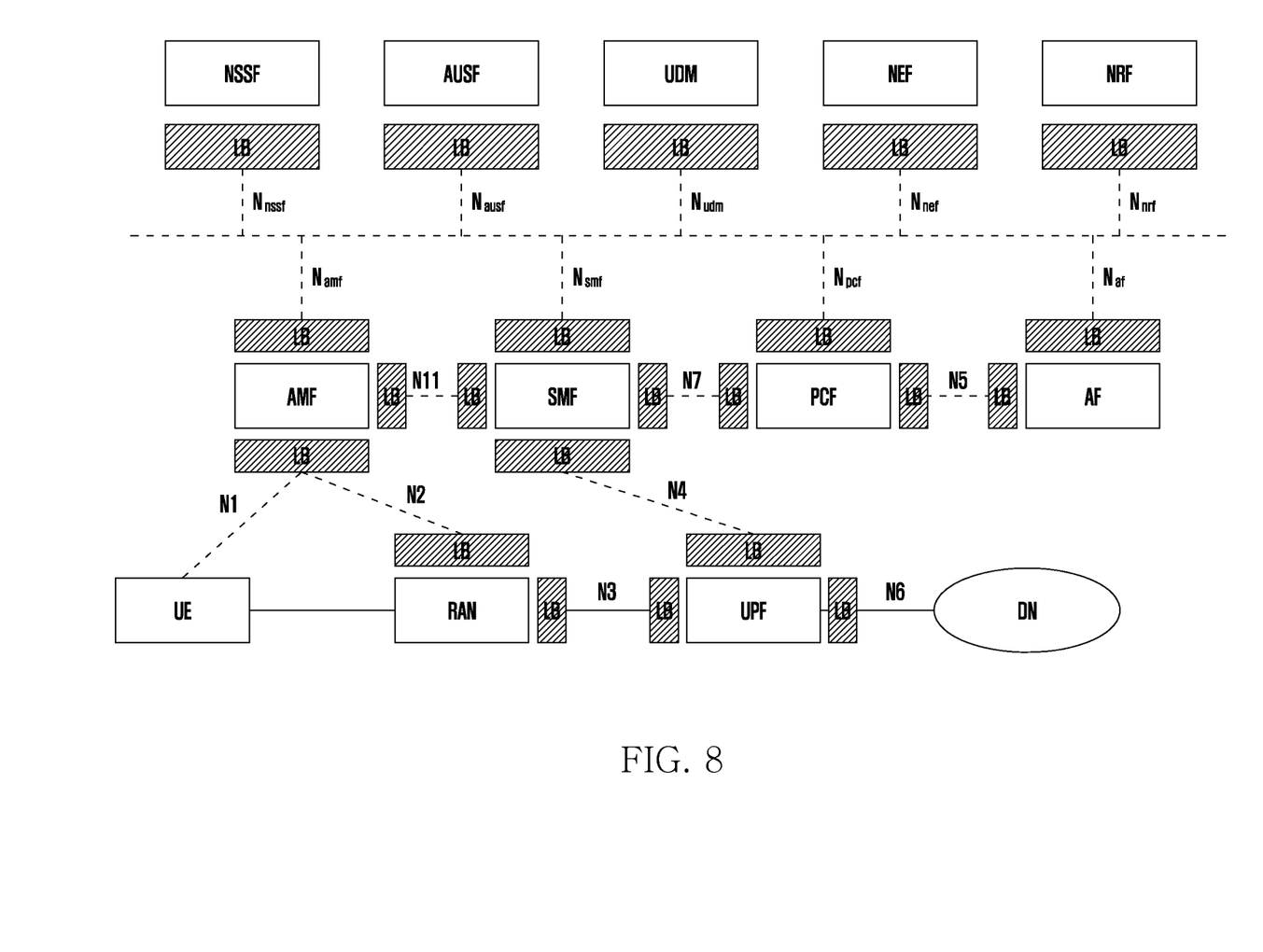
FIG. 8 is a diagram illustrating a core network structure and network entities according to an embodiment of the disclosure.

FIG. 8 is a diagram illustrating a core network structure and network entities according to an embodiment of the disclosure.

Referring to FIG. 8, it is illustrated a situation in which a load balancer (or load balancing instance) is configured corresponding to each network entity according to the above-described embodiment, in addition to the core network structure of FIG. 1. Each load balancer LB shown in FIG. 8 indicates the load balancing instance described above.

Further, referring to FIG. 8, it is illustrated a situation in which a load balancer (or a load balancing instance) is configured for each interface of each network entity. However, as described above, the load balancer (or load balancing instance) can be created according to a request from a client, and thus, the load balancer (or load balancing instance) may not be configured for a network entity at a specific timing point. Further, at one timing point, one load balancer (or load balancing instance) may be configured, and at another timing point, a plurality of load balancers (or load balancing instances) may be configured.

Further, although it is illustrated in FIG. 8 that a plurality of load balancers (or load balancing instances) are configured for a specific network entity, it is only an example illustrated to help easily understand the situation in which one network entity is connected to other network entities via an interface. Accordingly, although it is illustrated in FIG. 8 that a specific network entity is configured with several LBs, the corresponding LBs may imply a single load balancer (or load balancing instance).

Such a load balancer (or load balancing instance) may be configured to consider the specificity of each network entity or interface. That is, the load balancer (or load balancing instance) may be customized in consideration of its corresponding network entity or interface.

For example, in the case of User Plane Function (UPF), there is a characteristic of processing a large number of packets compared to other network entities. Accordingly, a larger number of load balancers (or load balancing instances) may be configured for UPF compared to other network entities.

For another example, since an N2 interface (or next generation application protocol (NGAP)) between AMF and RAN communicates using the SCTP protocol, a load balancer (or load balancing instance) for handling packet flow between AMF and RAN may be configured based on Linux kernel including an ipvsadm engine. Further, in the case of such an N4 interface, it has a feature that a data packet received should not perform a source NAT (SNAT) in the course of passing through a load balancer (or load balancing instance). Therefore, the load balancer (or load balancing instance) may be configured customized with the load balancing scheme and its topology suited for reflecting such a feature, and as an example of such customization, an additional operation may be performed of setting a default routing of Pods to a load balancing instance may be performed to set the default routing of the pods as the load balancing instance at a time when a pod is created.

As another example, the N4 interface between SMF and UPF communicates using GTP-C (General Packet Radio Service tunneling protocol control) protocol, so it would be possible to configure a load balancing instance including an envoy or nginix engine (or module). Further, even for a load balancer (or a load balancing instance) receiving a packet from the UPF via the N4 interface, the SNAT for data packets should not be performed, similar to the N2 interface, so it would be possible to configure and operate the load balancer (or the load balancing instance) by reflecting the above-described customization.

As another example, an N3 interface between RAN and UPF and an N6 interface between UPF and DN communicate using the GTP-U (GTP user) protocol, in which a large number of packets are transmitted and received over the bandwidth, resulting in a large amount of packet processing burden. Thus, the load balancer (or load balancing instance) may be configured to include a hardware accelerator, and it may be configured to include, for example, a graphics processing unit (GPU) with smart NIC (Network Interface Card), FPGA NIC, NIC acceleration or the like.

For another example, a service-based interface (SBI), that is, an interface such as e.g., Nnssf, Namf, Nausf, Nsmf, Nudm, Npcf, Nnef, Naf, Nnrf, or the like communicates using HTTP2.0 protocol or with gRPC-based request, so a load balancing instance may be configured to provide L7-based load balancing through an envoy engine (or module) or to provide another LBaaS (load balancing as a service) solution.

According to the load balancing scheme and the load balancer (or load balancing instance) according to various embodiments described above with reference to FIGS. 1 to 8, it is possible to provide a service optimized for a packet flow and a data packet according thereto. In particular, the load balancing instance can be configured depending upon the result of classifying the requests based on various parameters including the characteristics of the client's requests, thereby not only satisfying the requirements of the requests and the performance, but also enabling efficient use of the network resources.

In addition, it is possible to configure an engine, a load balancing scheme and its topology optimized for criteria, policies and settings, so that efficient load balancing can be performed with only one load balancer (or load balancing instance) even in a situation where resources for sequentially arranging a plurality of load balancers are insufficient.

Further, according to the load balancer and the load balancing method according to the embodiments disclosed herein, a separate network service header (NSH) for metadata or service path is not required, so there is no need to have a service header processing module of a network entity. Therefore, the load balancer and the load balancing method thereof have an advantage that they can be optimally applied to any network entity without being constrained by a network environment or architecture.

Furthermore, since the load balancers are located fully distributed across the network, a situation in which a specific network entity is inevitably selected according to the result of classifying the request does not occur. Further, it can be applied to a general use-case without a particular combination of a service function chain (SFC) and a use-case.

The embodiments disclosed heretofore with reference to the disclosure and drawings are only provided as specific examples to easily describe the contents of the disclosure and help understanding the same, and are not intended to limit the scope of the disclosure thereto. Therefore, the scope of the disclosure should be construed as including all changes or modifications derived based on the disclosure in addition to the embodiments disclosed herein.

Further, it goes without saying that one or more of the embodiments disclosed herein may be performed in combination with each other, and some or all of certain embodiments may be performed in combination with some or all of the other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a load balancer for multi-level load balancing with a plurality of protocols of layers in a communication system, the method comprising:
   receiving service requests related to a network entity;
   identifying a protocol corresponding to a service request based on classifying the service requests in accordance with a protocol type;
   in a case that the protocol corresponds to a first protocol among the plurality of protocols, determining a first load balancing scheme at a first level for processing traffic related to the first protocol and selecting a first engine supporting the first protocol;
   in a case that the protocol corresponds to a second protocol among the plurality of protocols, determining a second load balancing scheme at a second level for processing traffic related to the second protocol and selecting a second engine supporting the second protocol;
   creating a load balancing instance including the first load balancing scheme and the first engine or including the second load balancing scheme and the second engine; and
   performing load balancing on data packets related to the service requests in accordance with the load balancing instance.

2. The method of claim 1,
   wherein the first load balancing scheme corresponds to a load balancing at a kernel level with layer 4 (L4) processing and the first protocol comprises stream control transmission protocol (SCTP), and
   wherein the second load balancing scheme corresponds to a load balancing at an application level with layer 7 (L7) processing and the second protocol comprises a hypertext transfer protocol (HTTP).

3. The method of claim 1,
   wherein the first engine and the second engine are included in an engine group configured to perform the load balancing by the load balancer, and
   wherein the engine group comprises one or more of an envoy engine, an ipvsadm engine, an nginx engine, a smart network interface card (NIC), or a field programmable gate array (FPGA) NIC.

4. The method of claim 1,
   wherein the plurality of protocols comprise two or more of layer 4 (L4) protocol, layer 7 (L7) protocol, stream control transmission protocol (SCTP), hypertext transfer protocol version 2 (HTTP2.0), general packet radio service tunneling protocol control (GTP-C), and GTP user (GTP-U), google remote procedure call (gRPC), or structured query language (SQL).

5. The method of claim 1,
   wherein each of the first engine and the second engine is configured of an engine chain including two or more engines, and
   wherein a load balancing path of the engine chain is determined according to a priority of the two or more engines.

6. A load balancer for performing multi-level load balancing with a plurality of protocols of layers in a communication system, the load balancer comprising:
   memory storing instructions; and
   at least one processor,
   wherein the instructions, when executed by the at least one processor, cause the load balancer to:
     receive service requests related to a network entity,
     identify a protocol corresponding to a service request based on classifying the service requests in accordance with a protocol type,
     in a case that the protocol corresponds to a first protocol among the plurality of protocols, determine a first load balancing scheme at a first level for processing traffic related to the first protocol and selecting a first engine supporting the first protocol,
     in a case that the protocol corresponds to a second protocol among the plurality of protocols, determine a second load balancing scheme at a second level for processing traffic related to the second protocol and selecting a second engine supporting the second protocol, create a load balancing instance including the first load balancing scheme and the first engine or including the second load balancing scheme and the second engine, and perform load balancing on data packets related to the service requests in accordance with the load balancing instance.

7. The load balancer of claim 6,
wherein the first load balancing scheme corresponds to a load balancing at a kernel level with layer 4 (L4) processing and the first protocol comprises stream control transmission protocol (SCTP), and wherein the second load balancing scheme corresponds to a load balancing at an application level with layer 7 (L7) processing and the second protocol comprises a hypertext transfer protocol (HTTP).

8. The load balancer of claim 6,
wherein the first engine and the second engine are included in an engine group configured to perform the load balancing by the load balancer, and wherein the engine group comprises one or more of an envoy engine, an ipvsadm engine, an ngnix engine, a smart network interface card (NIC), or a field programmable gate array (FPGA) NIC.

9. The load balancer of claim 6,
wherein the plurality of protocols comprise two or more of layer 4 (L4) protocol, layer 7 (L7) protocol, stream control transmission protocol (SCTP), hypertext transfer protocol version 2 (HTTP2.0), general packet radio service tunneling protocol control (GTP-C), and GTP user (GTP-U), google remote procedure call (gRPC), or structured query language (SQL).

10. The load balancer of claim 6,
wherein each of the first engine and the second engine is configured of an engine chain including two or more engines, and wherein a load balancing path of the engine chain is determined according to a priority of the two or more engines.

11. The load balancer of claim 6, wherein the instructions, when executed by the at least one processor, cause the load balancer to:

for the performing the load balancing on the data packets related to the service requests, allocate at least one first pod in the network entity for a first service and at least one second pod in the network entity for a second service.

12. The load balancer of claim 6, wherein the network entity includes at least one of a session management function (SMF) or an access and mobility management function (AMF).

13. The method of claim 1, wherein the performing the load balancing on the data packets related to the service requests comprises allocating at least one first pod in the network entity for a first service and at least one second pod in the network entity for a second service.

14. The method of claim 1, wherein the network entity includes at least one of a session management function (SMF) or an access and mobility management function (AMF).

15. The method of claim 1,
wherein the first load balancing scheme or the second load balancing scheme is determined based on service level agreement (SLA), and quality of service (QOS) of a packet flow of the service request, and wherein the first load balancing scheme or the second load balancing scheme corresponds to one of a plurality of load balancing schemes.

16. The load balancer of claim 6,
wherein the first load balancing scheme or the second load balancing scheme is determined based on service level agreement (SLA), and quality of service (QOS) of a packet flow of the service request, and wherein the first load balancing scheme or the second load balancing scheme corresponds to one of a plurality of load balancing schemes.

* * * * *